(12) United States Patent
Garcia

(10) Patent No.: US 9,341,162 B2
(45) Date of Patent: May 17, 2016

(54) FREQUENCY CONTROL

(75) Inventor: Jorge Martinez Garcia, Aarhus N. (DK)

(73) Assignee: Vestas Wind Systems A/S, Aarhus N. (DK)

( * ) Notice: Subject to any disclaimer, the term of this patent is extended or adjusted under 35 U.S.C. 154(b) by 1055 days.

(21) Appl. No.: 13/259,459

(22) PCT Filed: Mar. 25, 2010

(86) PCT No.: PCT/EP2010/053905
§ 371 (c)(1),
(2), (4) Date: Oct. 26, 2011

(87) PCT Pub. No.: WO2010/108979
PCT Pub. Date: Sep. 30, 2010

(65) Prior Publication Data
US 2012/0035775 A1 Feb. 9, 2012

Related U.S. Application Data

(60) Provisional application No. 61/163,260, filed on Mar. 25, 2009.

(30) Foreign Application Priority Data

Mar. 25, 2009 (DK) .................................. 2009 00407

(51) Int. Cl.
*G05D 9/04* (2006.01)
*F03D 9/00* (2016.01)
*F03D 7/02* (2006.01)
*F03D 7/04* (2006.01)
*H02J 3/06* (2006.01)
*H02J 3/38* (2006.01)

(52) U.S. Cl.
CPC .............. *F03D 9/003* (2013.01); *F03D 7/0284* (2013.01); *F03D 7/043* (2013.01); *H02J 3/06* (2013.01); *H02J 3/386* (2013.01); *F05B 2270/337* (2013.01); *Y02E 10/723* (2013.01); *Y02E 10/763* (2013.01)

(58) Field of Classification Search
None
See application file for complete search history.

(56) References Cited

U.S. PATENT DOCUMENTS 5,808,462 A * 9/1998 Fujii et al. .................. 324/76.13
6,219,623 B1 * 4/2001 Wills .............................. 702/60
(Continued)

FOREIGN PATENT DOCUMENTS

| EP | 1914419 A1 | 4/2008 |
|---|---|---|
| WO | 03007455 A1 | 1/2003 |
| WO | 2005027301 A1 | 3/2005 |

OTHER PUBLICATIONS

International search report for international application No. PCT/EP2010/053905 dated Nov. 10, 2010.

*Primary Examiner* — Sean Shechtman
(74) *Attorney, Agent, or Firm* — Patterson + Sheridan, LLP

(57) ABSTRACT

A method is disclosed for controlling a fundamental frequency of power supply grid being operatively connected to a power supply grid. The method includes determining a variation of active power at one or more locations within the power supply grid, updating based on the determination a calculation of at least one of a steady-state and a dynamic-state related coefficient parameter of the power supply grid, and determining, using a frequency controller of the wind turbine facility and based on the updated calculation, an amount of active power to inject into the power supply grid corresponding to a desired fundamental frequency of the power supply grid.

21 Claims, 1 Drawing Sheet

(56) References Cited

U.S. PATENT DOCUMENTS

| | | | |
|---|---|---|---|
| 6,338,009 B1 * | 1/2002 | Sato | H02J 3/24 700/286 |
| 7,346,462 B2 * | 3/2008 | Delmerico | 702/60 |
| 2006/0087124 A1 * | 4/2006 | Stahlkopf | 290/44 |
| 2008/0093857 A1 * | 4/2008 | Stiesdal | 290/44 |
| 2009/0167021 A1 * | 7/2009 | Andersen | 290/44 |

* cited by examiner

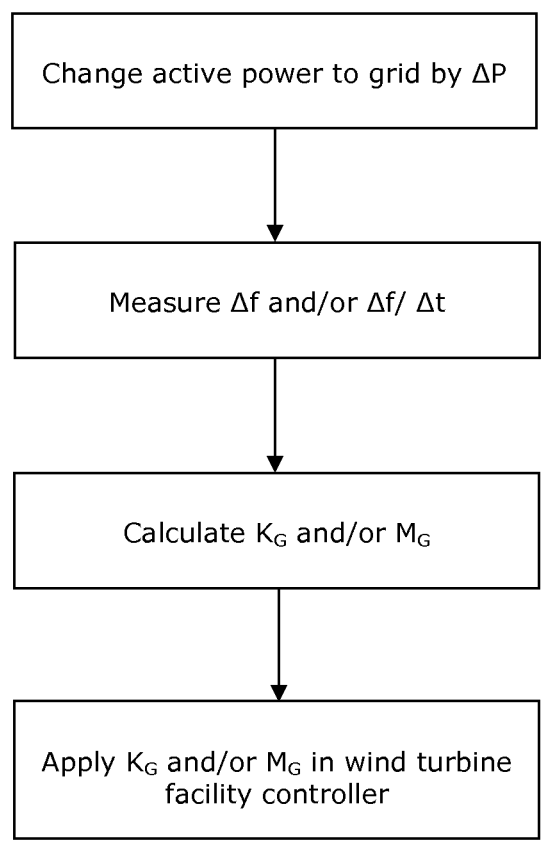

FREQUENCY CONTROL

FIELD OF THE INVENTION

The present invention relates to a method for improving the frequency controller characteristics of a wind turbine facility, such as a wind power plant, connected to a power supply grid. The method according to the present invention involves determination of a steady-state and/or a dynamic-state related grid parameter. The present invention further relates to a control system and a wind turbine facility capable of performing the before-mentioned method.

BACKGROUND OF THE INVENTION

It is well-known that power generating units, such as wind power plants, can be operated so as to control the fundamental frequency of the power supply grid operatively connected to the power generating units.

In order to control the fundamental frequency of a power supply grid in an optimal manner information about the steady-state and the dynamic properties of the power supply grid is required.

A method for varying the active power provided by a wind energy installation is suggested in EP 1 914 419. The method suggested in EP 1 914 419 involves that the amount of injected active power from the wind energy installation is a function of the actual grid frequency. As disclosed in EP 1 914 419 the amount of active power, P, varies with the grid frequency, f, in the following manner:

$$P = K_1(f - f_N) + K_2 \frac{df}{dt}$$

where f is the actual grid frequency, $f_N$ is the nominal grid frequency, and $K_1$ and $K_2$ are constants. The constants $K_1$ and $K_2$ are typically provided by the power distributor. Thus, the constants $K_1$ and $K_2$ are completely static and their values do not account for changes occurring in the power supply grid. It is an object of embodiments of the invention to provide a method and a control system applying actual and updated information about the stiffness and the inertia of a power supply grid in order to control the fundamental frequency of said power supply grid in an optimal manner.

DESCRIPTION OF THE INVENTION

The above-mentioned object is complied with by providing, in a first aspect, a method for controlling a fundamental frequency of a power supply grid operatively connected to a wind turbine facility, the method comprising the steps of
  determining a steady-state and/or a dynamic-state related parameter of the power supply grid operatively connected to the wind turbine facility,
  applying said determined parameter(s) in a frequency controller of the wind turbine facility, and
  controlling the fundamental frequency of power supply grid by changing an amount of injected active power.

The term wind turbine facility should be understood broadly. Thus, the term wind turbine facility is intended to cover wind turbines being operated as isolated wind turbines or wind turbines being operated in small groups, wind power plants or associations of such wind power plants.

The steady-state related parameter may be associated with a stiffness coefficient, $K_G$, of the power supply grid. The dynamic-state related parameter may be associated with an inertia coefficient, $M_G$, of the power supply grid.

Preferably, the stiffness coefficient, $K_G$, and the inertia coefficient, $M_G$, are determined from active power variations from the wind power plant, $\Delta P_{wind\,plant}$. If a wind power plant can not effectively shift the grid frequency other active power variations induced by other events, $\Delta P_{grid}$, can be used instead. The determinations of the stiffness coefficient, $K_G$, and the inertia coefficient, $M_G$, may comprise measurements of one or more parameters (such as active power and grid frequency) followed by one or more calculations. More details regarding the determination of $K_G$ and $M_G$ are disclosed in further details below.

As previously stated the step of determining the steady-state related parameter and the dynamic-state related parameter involves determination of active power variations. The active power variations may be measured at the point of common coupling as $\Delta P_{wind\,plant}$ or it may be determined as $\Delta P_{grid}$ from one or more measurements by sensors positioned at other grid locations. The step of determining the steady-state related parameter and the dynamic-state related parameter further involves determination of frequency variations, $\Delta f$, at the point of common coupling. Preferably, $\Delta f$ is determined by measurements at the point of common coupling.

In a second aspect, the present invention relates to a wind power control system for controlling a wind turbine facility comprising a frequency controller, wherein the operation of the frequency controller is adapted to be controlled in response to a determined steady-state and/or dynamic-state related parameter of an associated power supply grid.

Again, the term wind turbine facility should be understood broadly. Thus, the term wind turbine facility is intended to cover wind power plants or wind turbines being operated as isolated wind turbines or wind turbines being operated in small groups, or several wind power plants operated as one.

The term wind power control system should be understood broadly. Thus, the term wind power control system may be a controller on a single wind turbine level, a wind power plant controller or a supervisory control and data acquisition (SCADA).

Similar to the first aspect of the present invention the steady-state related parameter may be associated with a stiffness coefficient, $K_G$, of the power supply grid. The dynamic-state related parameter may be associated with an inertia coefficient, $M_G$, of the power supply grid. The determined values of $K_G$ and $M_G$ are applied in the wind power control system in order to enhance the performance of said control system. As it will be described in further details below $K_G$ and $M_G$ are applied in order to calculate the needed active power, $\Delta P$. In particular, $K_G$ is applied to determine the offset of active power needed in the system to balance consumption and demand, whereas $M_G$ is associated to the dynamics of the change in frequency.

The stiffness coefficient, $K_G$, and the inertia coefficient, $M_G$, of the power supply grid are determined as discussed in connection with the first aspect of the present invention.

The wind power control system may further be adapted to control a number of electric loads operatively connected to the associated power supply grid. The electrical loads may be connected to or disconnected from the power supply grid due to for example various forecast, such as a weather forecast, a load forecast etc. so require. Thus, the control system may be operable as a load scheduling manager and/or as a local area supervisor.

In a third aspect, the present invention relates to a controller controlling a number of wind turbines being operationally connected to a power supply grid, the controller being configured in accordance with a dynamically determined steady-state and/or dynamic-state related parameter of the power supply grid, and adapted to control a number of electric loads operatively connected to the power supply grid.

Similar to the first and second aspects of the present invention the steady-state related parameter and the dynamic-state related parameter may be associated with a stiffness coefficient, $K_G$, and an inertia coefficient, $M_G$, of the power supply grid, respectively. The determined values of $K_G$ and $M_G$ are applied in the controller in order to enhance the performance of the controller.

The stiffness coefficient, $K_G$, and the inertia coefficient, $M_G$, of the power supply grid are determined as discussed in connection with the first aspect of the present invention.

The controller may be adapted to connect and/or disconnect the electrical loads to/from the power supply grid due to for example various forecast, such as a weather forecast, a load forecast etc. so require. Thus, the controller may be operable as a load scheduling manager and/or as a local area supervisor.

In a fourth aspect the present invention relates to a wind turbine facility comprising a wind power control system according to the second aspect of the present invention.

In a fifth aspect the present invention relates to a method for determining a steady-state grid parameter, $K_G$, of a power supply grid operatively connected to a wind turbine facility, the method comprising the steps of changing a provided active power level by a predetermined amount, $\Delta P$, and measuring a frequency change, $\Delta f$, in response thereto.

Thus, by changing the active power injection to the grid a predetermined amount and measuring the resulting frequency change the steady-state grid parameter, $K_G$, also denoted the stiffness of the grid, may be determined.

In a sixth aspect the present invention relates to a method for determining a dynamic-state grid parameter, $M_G$, of a power supply grid operatively connected to a wind turbine facility, the method comprising the steps of changing a provided active power level by a predetermined amount, $\Delta P$, and measuring a frequency change rate, $\Delta f/\Delta t$, in response thereto.

Thus, by changing the active power injection to the grid a predetermined amount and measuring the resulting frequency change rate the dynamic-state grid parameter, $M_G$, also denoted the inertia of the grid, may be determined.

The stiffness coefficient, $K_G$, and the inertia coefficient, $M_G$, of the power supply grid may advantageously be determined dynamically, i.e. at predetermined time intervals. Such predetermined time intervals may be around 10 minutes. Thus, every 10 minutes the stiffness coefficient, $K_G$, and the inertia coefficient, $M_G$, of the power supply grid are determined, and may thus be applied in wind turbine facility control systems. In this way information regarding the grid stiffness and the grid inertia may be continuously provided to a wind turbine facility controller.

In the methods according to the fifth and sixth aspects the provided active power level may be increased by the predetermined amount, $\Delta P$. Alternatively, the provided active power level may be decreased by the predetermined amount, $\Delta P$.

The provided active power level may be changed by changing the active power output from the wind turbine facility itself. Alternatively or in combination therewith, the provided active power level may be changed by changing the active power output of other power generating units operatively connected to the power supply grid. Such other power generating units may include a remotely located power generating unit, such as a remotely positioned wind turbine, a remotely positioned wind power plant, an association of remotely positioned wind power plants, a remotely positioned traditional power plant or even a combination thereof.

In a seventh aspect the present invention relates to a method for configuring a control unit of a wind turbine facility, the method comprising the steps of
    determining a steady-state and/or a dynamic-state related parameter of the power supply grid operatively connected to the wind turbine facility, and
    applying said determined parameter(s) in the control unit of the wind turbine facility.

The steady-state and the dynamic-state related parameters may be determined according to the methods of the fifth and sixth aspects.

BRIEF DESCRIPTION OF THE DRAWING

The present invention will now be explained in further details with reference to FIG. 1 which illustrates how the grid stiffness and the grid inertia is determined and subsequently applied in the wind turbine facility controller.

While the invention is susceptible to various modifications and alternative forms, specific embodiments have been disclosed by way of examples. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE INVENTION

The present invention will now be explained in further details. In its broadest aspect the present invention relates to a method for controlling a fundamental frequency of a power supply grid being operatively connected to a wind turbine facility by determining a steady-state and/or a dynamic-state related parameter of the power supply grid, and applying said determined parameter(s) in a controller.

As previously mentioned, the term wind turbine facility should be understood broadly. Thus, the term wind turbine facility is intended to cover wind turbines being operated as isolated wind turbines or wind turbines being operated in small groups, wind power plants or associations of such wind power plants.

As it is shown in FIG. 1, and as it will be explained in further details below one aspect of the present invention is concerned with changing (adding or reducing) the active power provided to the grid by a given amount, $\Delta P$, and subsequently measuring an absolute frequency change, $\Delta f$, and/or a frequency change rate, $\Delta f/\Delta t$, in response thereto.

It should be noted that a single wind turbine is not capable of shifting the fundamental frequency of a stiff power supply grid. However, a single wind turbine might be able to shift the fundamental frequency of a weak isolated power supply grid.

In order to carry out the present invention the following parameters need to be determined:
1. Frequency variations at the point of common coupling, $\Delta f_{grid}$
2. Active power variations induced by remote grid events, $\Delta P_{grid}$
3. Active power variation (this can be induced by the controller as well) at the point of common coupling, $\Delta P_{wind\,plant}$ Information about $\Delta P_{grid}$ is provided to the wind turbine facility controller from power grid sensors positioned at remote grid locations. The information is provided via a suitable communication network.

The performance of the power supply grid regarding frequency and active power flow can be characterised in the following manner:

$$M_G \frac{\Delta f}{\Delta t} + K_G \Delta f = -\Delta P$$

where $K_G$ and $M_G$ represent the stiffness and the inertia of the power supply grid, respectively.

Thus, the steady-state related parameter of the power supply grid (stiffness of the grid) is $K_G$, whereas the dynamic-state related parameter of the power supply grid (inertia of the grid) is $M_G$.

The following term is related to the total frequency change—from now on called the steady term:

$$K_G \Delta f = -\Delta P$$

Thus, $K_G$ is ideally determined by changing the active power a predetermined amount, $\Delta P$, and measuring a frequency change, $\Delta f$, in response thereto. In order to determine a total change of active power, P, can optionally be measured at different grid locations.

Similarly, the following term is related to the rate of the frequency change—from now on called the dynamic term:

$$M_G \frac{\Delta f}{\Delta t} = -\Delta P$$

Thus, $M_G$ is ideally determined by changing the active power a predetermined amount, $\Delta P$, and measuring a frequency change rate, $\Delta f/\Delta t$, in response. Again, in order to determine a total change of active power, P, can optionally be measured at different grid locations.

The change in active power, $\Delta P$, can be an increase or a decrease of a total active power level provided to the power supply grid. The total active power level is typically provided by several power generating units, such as isolated wind turbines, wind power plants or even traditional power plants.

The change in active power (positive or negative) may be caused by the wind turbine facility itself. Alternatively or in combination therewith, the active power change may be caused by a remotely located power generating unit, such as a remotely positioned wind turbine, a remotely positioned wind power plant, an association of remotely positioned wind power plants, a remotely positioned traditional power plant or even a combination thereof.

If the active power change is caused by a remotely positioned power generating unit information about the level of the active power change, $\Delta P$, is provided to the wind turbine facility controller via a suitable communication network along with local and/or remote measurements of $\Delta f$ and/or $\Delta f/\Delta t$. When $\Delta P$, $\Delta f$ and/or $\Delta f/\Delta t$ are known the grid stiffness, $K_G$, and the grid inertia, $M_G$, can be calculated and applied by the wind turbine facility controller—cf. FIG. 1.

If basis for the calculations is active power variations at the point of common coupling $\Delta P$ equals $\Delta P_{wind\,plant}$. Similarly, if the basis for the calculations is active power variations induced by remote grid events $\Delta P$ equals $\Delta P_{grid}$.

As illustrated in FIG. 1 the determined values of $K_G$ and $M_G$ are applied in the controller in order to improve the frequency control. The values of $K_G$ and $M_G$ can be determined dynamically, such as for example every 10 minutes. Typically a time span of 10 minutes is sufficient since the configuration of the grid does not change so often. Alternative or in addition, settings for grid frequency levels can be used to trigger the update of $K_G$ and $M_G$. The actual and short term power forecast produced by the wind power plant can be used to limit the maximum value of power demanded by the controller, if the forecasted $\Delta f$ is bigger than some predefined settings.

As an option $K_G$ and $M_G$ can be introduced by the user from a look up table. Various external conditions such as for example time, wind power, active power production, and voltage level could be selected in accordance therewith.

Moreover, the controller of the wind power plant may be configured to control various types of loads in the nearby area. Such loads could be static loads, such as for example residential consumptions, and/or dynamic loads, such as for example electrical motors. Such various types of loads can be connected to or disconnected from the power supply grid if for example a weather forecast, a load forecast etc. so require. In this way the controller can be operated as a load scheduling manager and/or as a local area supervisor—the local area supervision including tasks involving processing of active power data from other grid locations.

The invention claimed is:

1. A method of controlling a fundamental frequency of a power supply grid operatively connected with a wind turbine facility, the method comprising:
producing a predetermined variation of active power at one or more locations within the power supply grid;
determining, responsive to producing the predetermined variation of active power, a frequency variation of the power supply grid;
updating, based on the determination, a calculation of at least one of a steady-state related coefficient parameter and a dynamic-state related coefficient parameter of the power supply grid, wherein the steady-state related coefficient parameter and the dynamic-state related coefficient parameter each associate the variation of active power with the frequency variation of the power supply grid;
determining, using a frequency controller of the wind turbine facility and based on the updated calculation, an amount of active power to provide to the power supply grid corresponding to a desired fundamental frequency of the power supply grid; and
controlling, using the frequency controller, the wind turbine facility to provide the determined amount of active power to the power supply grid.

2. The method of claim 1, wherein the steady-state related coefficient parameter includes a stiffness coefficient of the power supply grid.

3. The method of claim 1, wherein the dynamic-state related coefficient parameter includes an inertia coefficient of the power supply grid.

4. The method of claim 1, wherein the variation of active power is determined at a point of common coupling of the power supply grid with the wind turbine facility.

5. The method of claim 1, wherein updating a calculation of at least one of the steady-state related coefficient parameter and the dynamic-state related coefficient parameter includes determining, responsive to determining the variation of active power, a frequency variation at a point of common coupling of the power supply grid with the wind turbine facility.

6. The method of claim 1, further comprising:
performing, at a predetermined time interval, one or more subsequent calculation updates of at least one of the steady-state related coefficient parameter and the dynamic-state related coefficient parameter.

7. The method of claim 1, further comprising:
performing, based on a level of the frequency of the power supply grid, one or more subsequent calculation updates of at least one of the steady-state related coefficient parameter and the dynamic-state related coefficient parameter.

8. A wind power control system for controlling a wind turbine facility operatively connected with a power supply grid, the control system operable to produce a predetermined variation of active power at one or more locations within the power supply grid and the control system comprising:
a frequency measurement means used to determine, responsive to producing the predetermined variation of active power, a frequency variation at one or more locations within the power supply grid; and
a frequency controller coupled with the frequency measurement means and configured to adapt control of the wind turbine facility based on at least one of a calculated steady-state related coefficient parameter and a calculated dynamic-state related coefficient parameter of the power supply grid, wherein the steady-state related coefficient parameter and the dynamic-state related coefficient parameter each associate the variation of active power with the frequency variation of the power supply grid,
wherein the calculation is dynamically updated based on the determined variation of active power.

9. The wind power control system of claim 8, wherein the calculated steady-state related coefficient parameter includes a stiffness coefficient of the power supply grid.

10. The wind power control system of claim 8, wherein the calculated dynamic-state related coefficient parameter includes an inertia coefficient of the power supply grid.

11. The wind power control system of claim 8, wherein the variation of active power is determined at a point of common coupling of the power supply grid with the wind turbine facility.

12. The wind power control system of claim 8, wherein the steady-state related coefficient parameter and the dynamic-state related coefficient parameter are calculated based on a determined frequency variation at a point of common coupling of the power supply grid with the wind turbine facility.

13. The wind power control system of claim 8, wherein the frequency controller is further configured to control one or more electric loads operatively connected with the power supply grid.

14. A wind turbine facility comprising a wind power control system according to claim 8.

15. The control system of claim 8, wherein the power measurement means includes one or more sensors disposed at one or more remote grid locations.

16. The control system of claim 8, wherein the power measurement means includes one or more sensors disposed at a point of common coupling of the power supply grid with the wind turbine facility.

17. A method for determining a dynamic-state grid parameter $M_G$ of a power supply grid operatively connected to a wind turbine facility, the method comprising:
changing, using one or more power sources coupled with the power supply grid, an active power level provided by the one or more power sources to the power supply grid by a predetermined amount $\Delta P$;
measuring a frequency change rate $\Delta f/\Delta t$ of the power supply grid in response to the changed active power level; and
associating the predetermined amount $\Delta P$ with the measured frequency change rate $\Delta f/\Delta t$ to produce the dynamic-state grid parameter $M_G$,
wherein the dynamic-state grid parameter $M_G$, when applied to a frequency controller of the wind turbine facility, controls subsequent frequency regulation operation of the frequency controller.

18. A method for determining a steady-state grid parameter $K_G$ of a power supply grid operatively connected with a wind turbine facility, the method comprising:
changing, using one or more power sources coupled with the power supply grid, an active power level provided by the one or more power sources to the power supply grid by a predetermined amount $\Delta P$;
measuring a frequency change $\Delta f$ of the power supply grid in response to the changed active power level; and
associating the predetermined amount $\Delta P$ with the measured frequency change $\Delta f$ to produce the steady-state grid parameter $K_G$,
wherein the steady-state grid parameter $K_G$, when applied to a frequency controller of the wind turbine facility, controls subsequent frequency regulation operation of the frequency controller.

19. The method of claim 18, wherein the one or more power sources is the wind turbine facility.

20. The method of claim 18, wherein the one or more power sources is one or more power generating units other than the wind turbine facility, the method further comprising:
communicating, from one or more controllers associated with the one or more other power generating units, the predetermined amount $\Delta P$ to the frequency controller of the wind turbine facility.

21. A method to dynamically adapt a control unit of a wind turbine facility operatively connected with a power supply grid, the method comprising:
producing a predetermined variation of active power at one or more locations within the power supply grid;
determining, responsive to producing the predetermined variation of active power, a frequency variation of the power supply grid;
updating a calculation of at least one of a steady-state related coefficient parameter and a dynamic-state related coefficient parameter of the power supply grid, wherein the steady-state related coefficient parameter and the dynamic-state related coefficient parameter each associate a variation of active power of the power supply grid with the frequency variation of the power supply grid; and
applying the updated calculation to the control unit in order to control power output to the power supply grid.

* * * * *